UNITED STATES PATENT OFFICE.

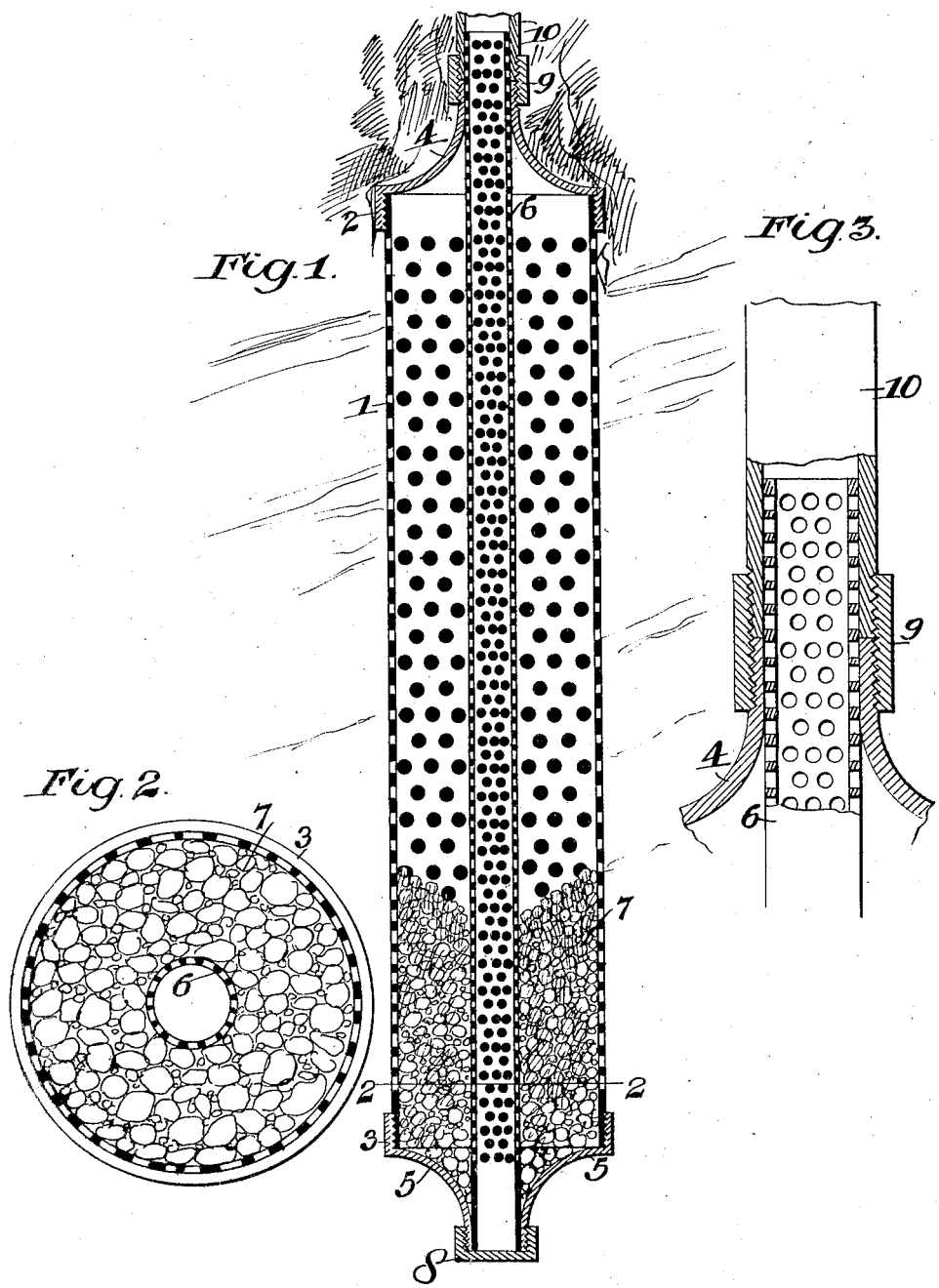

HENRY BURGARD, OF NEW ORLEANS, LOUISIANA.

WELL-SCREEN.

1,356,187.

Specification of Letters Patent.

Patented Oct. 19, 1920.

Application filed March 19, 1918. Serial No. 223,439.

*To all whom it may concern:*

Be it known that I, HENRY BURGARD, a citizen of the United States, and a resident of New Orleans, in the parish of Orleans and State of Louisiana, have invented certain new and useful Improvements in Well-Screens, of which the following is a specification.

My invention relates to improvements in well screens, and it consists in the constructions, combinations and arrangements herein described and claimed.

An object of my invention is to provide a well screen arranged in such a manner that the screen head may be embedded in a gas, water or oil stratum and automatically sealed in position by the strata above.

Another object of the invention is to provide a well screen of the type described including outer and inner liners with gravel in the space between the liners, the outer liner being adapted to be sealed in position in the gas, water or oil stratum, the inner liner readily permitting the flushing of the well.

Another object of the invention is to provide a well screen including the outer and inner perforated liners as described, a shouldered coupling being provided between said liners at the top to support the strata above when the screen head reaches the proper position in the gas, water or oil stratum, thus automatically sealing the screen head.

Other objects and advantages will appear in the following specification, reference being had to the accompanying drawing in which:

Figure 1 is a central vertical section of a well screen constructed in accordance with my invention, Fig. 2 is a cross section on the line 2—2 of Fig. 1; and Fig. 3 is a detail section of the upper portion of the screen head showing the arrangement of mounting the coupling.

In carrying out my invention I provide an outer perforated liner 1 which is threaded at the top and bottom to receive the threaded flanges 2 and 3 of the upper and lower couplings 4 and 5 respectively. In the present instance both of these couplings are shown with rounded surfaces and likewise, both terminate in threaded reduced ends.

Located between the reduced ends of the upper and lower couplings and occupying a position in the center of the outside perforated liner 1, is an inside perforated liner 6. The space between the outside and inside perforated liners 1 and 6 at the bottom, is filled with gravel 7, which is adapted to filter the gas, water or oil which flows into the screen from the adjacent stratum on the outside.

A cap 8 closes the lower end of the inside liner 6 and may be arranged in any suitable manner to properly perform its purpose. A coupling including a sleeve 9 provides the attaching medium whereby the upper coupling 4 is secured to the lower end of a stem 10 which reaches to the surface. The fluid flowing into the well screen from the stratum on the outside, flows to the surface through the stem 10 after passing through the gravel 7.

An important feature of the invention resides in the arrangement of the double screen members, *i. e.* the outside tubular liner 1 and the inside tubular liner 6. The second important feature resides in the provision of the gravel 7 at the bottom. This gravel provides a filler between the outside and inside liners and also acts as a filter for the fluid.

The third feature of advantage resides in the arrangement of the upper coupling 4. The well hole into which the screen is projected, is first reamed out to the stratum containing the gas, water or oil, whereupon the screen which is attached to the stem 10 is lowered into position in the well hole in the fluid stratum. The well screen having reached the proper position automatically becomes sealed in place by the upper strata which falls upon the coupling 4, thus permitting a tight seal being obtained by properly cementing the well above the shoulder of the screen. This shuts out all water, sand and other extraneous substances from above the screen.

Should it be desired to flush the well, the inside liner 6 permits water to be injected. The outside perforated liner 1 will hold the strata firm in the well and the gravel 7 will permit the passage of the fluid which seeks its own channels in the interstices of the gravel. Naturally if it be desired to fill more of the space between the inside and outside liners 1 and 6, it may readily be done.

While the construction and arrangement of the well screen as herein described is that of a generally preferred form, obviously modifications and changes may be made without departing from the spirit of the invention or the scope of the claims.

I claim:—

1. A well screen, comprising an outer perforated liner, upper and lower couplings, with rims in which the ends of the outer liner are secured, thereafter merging into axially alined contracted portions, the lower coupling having a closure cap, the upper coupling being arranged for attachment to a stem; and an inner perforated liner located in said contracted portions, filtering material being filled between the liners, the upper end of the inner liner projecting beyond the upper contraction, the lower end being supported by the closure cap.

2. In a well screen, the combination with a stem, of a screen attached to the end of the stem, said screen comprising an inner perforated liner entering the bore of the stem, an outer perforated liner spaced from said inner liner, coupling means supporting the outer liner at the top, means for securing said coupling to the stem, coupling means securing the lower end of the outer liner, said coupling means being suitably shaped to receive the end of the inner liner, and means including a closure embodied in said shaped means providing an abutment and support for the inner liner.

HENRY BURGARD.